United States Patent
Chandrasekaran et al.

(10) Patent No.: US 10,075,588 B2
(45) Date of Patent: Sep. 11, 2018

(54) MANAGING COMMUNICATION EVENTS

(71) Applicant: Microsoft Technology Licensing, LLC, Redmond, WA (US)

(72) Inventors: Vijay Chandrasekaran, Sunnyvale, CA (US); Nicholas Mark Cordrey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/884,455

(22) Filed: Oct. 15, 2015

(65) Prior Publication Data
US 2017/0111496 A1    Apr. 20, 2017

(51) Int. Cl.
| H04M 3/42 | (2006.01) |
| H04L 12/26 | (2006.01) |
| H04M 7/00 | (2006.01) |
| H04L 29/06 | (2006.01) |
| H04M 3/54 | (2006.01) |
| H04M 15/00 | (2006.01) |

(52) U.S. Cl.
CPC ...... *H04M 3/4228* (2013.01); *H04L 43/0882* (2013.01); *H04L 65/1069* (2013.01); *H04L 65/80* (2013.01); *H04M 3/54* (2013.01); *H04M 7/006* (2013.01); *H04M 7/0057* (2013.01); *H04M 15/8016* (2013.01); *H04M 15/8044* (2013.01); *H04M 15/8214* (2013.01); *H04M 15/85* (2013.01); *H04M 15/853* (2013.01); *H04M 15/88* (2013.01)

(58) Field of Classification Search
None
See application file for complete search history.

(56) References Cited

U.S. PATENT DOCUMENTS

| 5,805,666 A | 9/1998 | Ishizuka et al. |
| 6,876,627 B1 | 4/2005 | Rao |
| 7,092,380 B1 | 8/2006 | Chen et al. |
| 7,379,436 B2 | 5/2008 | Jiang |
| 7,693,136 B1 | 4/2010 | Blair et al. |

(Continued)

FOREIGN PATENT DOCUMENTS

| CN | 104244198 | 12/2014 |

OTHER PUBLICATIONS

"Google Play: WiFi Phone Calls, SMS, Chat, Talk", Retrieved on: Nov. 6, 2015 Available at: https://play.google.com/store/apps/details?id=com.onePhone&hl=en, 3 pages.

(Continued)

*Primary Examiner* — Steven H D Nguyen
(74) *Attorney, Agent, or Firm* — Schwegman Lundberg & Woessner, P.A.

(57) ABSTRACT

A user terminal, the user terminal comprising a communication client application for managing communications with at least one further user terminal over a first network, the communication client application being configured to: determine with respect to at least one outgoing call the first network is a lower bandwidth data network; generate an interrupt message to be displayed; determine a user input in response to the interrupt message; and manage a placement of the communications with the at least one further user terminal over the first network based on the user input.

29 Claims, 9 Drawing Sheets

(56) References Cited

U.S. PATENT DOCUMENTS

| | | | |
|---|---|---|---|
| 7,768,996 B1 | 8/2010 | Fourie et al. | |
| 8,055,306 B2 | 11/2011 | Li | |
| 8,185,659 B2 | 5/2012 | Kruger et al. | |
| 8,369,847 B1* | 2/2013 | Shmunis | H04W 4/16 370/356 |
| 8,374,323 B2 | 2/2013 | Tal et al. | |
| 8,451,714 B2 | 5/2013 | Basart et al. | |
| 8,503,340 B1 | 8/2013 | Xu | |
| 8,553,588 B2 | 10/2013 | Jayaraman | |
| 8,565,225 B2 | 10/2013 | Rosen | |
| 8,619,964 B2 | 12/2013 | Pisani et al. | |
| 8,831,597 B1* | 9/2014 | Shmunis | H04M 3/42042 370/338 |
| 8,837,464 B2 | 9/2014 | Nasielski et al. | |
| 8,897,766 B2 | 11/2014 | Moore et al. | |
| 9,042,370 B2 | 5/2015 | Morrill et al. | |
| 9,049,637 B2 | 6/2015 | Sylvain | |
| 9,077,785 B2 | 7/2015 | Shuman et al. | |
| 2002/0173301 A1* | 11/2002 | Ikeda | H04W 88/02 455/419 |
| 2004/0202132 A1 | 10/2004 | Heinonen et al. | |
| 2005/0185674 A1 | 8/2005 | Ramsey et al. | |
| 2006/0063560 A1 | 3/2006 | Herle | |
| 2006/0253608 A1 | 11/2006 | Reynolds et al. | |
| 2007/0032236 A1* | 2/2007 | Kim | H04W 36/365 455/436 |
| 2008/0107051 A1* | 5/2008 | Chen | H04W 48/18 370/310 |
| 2008/0132228 A1* | 6/2008 | Mousseau | H04W 36/0066 455/426.1 |
| 2008/0214240 A1 | 9/2008 | Choi et al. | |
| 2008/0304637 A1 | 12/2008 | Ganganna | |
| 2008/0305786 A1* | 12/2008 | Arumi | H04W 52/0274 455/426.1 |
| 2008/0309749 A1 | 12/2008 | Feng et al. | |
| 2009/0017865 A1* | 1/2009 | Cole | H04M 1/2745 455/552.1 |
| 2009/0097450 A1 | 4/2009 | Wallis et al. | |
| 2009/0168676 A1* | 7/2009 | Olson | H04M 1/725 370/311 |
| 2010/0041397 A1* | 2/2010 | Chutorash | H04W 48/18 455/432.1 |
| 2010/0255820 A1* | 10/2010 | Maly | H04M 1/271 455/414.1 |
| 2010/0284267 A1 | 11/2010 | Domingguez Romero et al. | |
| 2011/0153816 A1 | 6/2011 | Lloyd et al. | |
| 2011/0261678 A1 | 10/2011 | Sutter et al. | |
| 2012/0046013 A1 | 2/2012 | Bauman | |
| 2012/0270538 A1* | 10/2012 | Meylan | H04W 4/003 455/426.1 |
| 2013/0029639 A1 | 1/2013 | Lee et al. | |
| 2013/0077482 A1 | 3/2013 | Krishna et al. | |
| 2013/0083726 A1 | 4/2013 | Jain et al. | |
| 2013/0100944 A1* | 4/2013 | Kwon | H04W 76/026 370/338 |
| 2013/0242964 A1* | 9/2013 | Hassan | H04W 48/18 370/338 |
| 2013/0329567 A1 | 12/2013 | Mathias et al. | |
| 2014/0024362 A1* | 1/2014 | Kang | H04M 1/27455 455/422.1 |
| 2014/0029732 A1 | 1/2014 | Liik | |
| 2014/0071895 A1 | 3/2014 | Bane et al. | |
| 2014/0106723 A1* | 4/2014 | Britstein | H04L 65/1006 455/417 |
| 2014/0106745 A1* | 4/2014 | Paczkowski | H04W 8/02 455/432.1 |
| 2014/0120859 A1 | 5/2014 | Ekici et al. | |
| 2014/0133304 A1* | 5/2014 | Pica | H04W 48/20 370/232 |
| 2014/0179266 A1 | 6/2014 | Schultz et al. | |
| 2014/0211700 A1 | 7/2014 | Anson et al. | |
| 2014/0242978 A1 | 8/2014 | Shuman et al. | |
| 2015/0085823 A1 | 3/2015 | Jain | |
| 2015/0282013 A1* | 10/2015 | Kim | H04L 65/1069 370/331 |
| 2015/0312391 A1* | 10/2015 | Yang | H04M 1/274575 455/414.1 |
| 2016/0021336 A1* | 1/2016 | Abbott | H04M 1/72572 348/14.02 |
| 2016/0255181 A1* | 9/2016 | Shaltiel | H04M 1/006 455/417 |
| 2017/0111514 A1 | 4/2017 | Chandrasekaran et al. | |
| 2017/0111835 A1 | 4/2017 | Chandrasekaran et al. | |

OTHER PUBLICATIONS

"iOS 9 Beta 5 Automatically Switches to Cell Data When Wi-Fi is Weak", Available at: http://gadgets.ndtv.com/mobiles/news/ios-9-beta-5-automatically-switches-to-cell-data-when-wi-fi-is-weak-725065, Aug. 7, 2015, 1 page.

"Network—Project Fi", Retrieved on: Oct. 20, 2015 Available at: https://fi.google.com/about/network/#network-of-networks, 9 pages.

"Republic Wireless", Available at: https://republicwireless.com/faqs/, May 18, 2015, 4 pages.

Fu,"On Robust and Efficient Performance over Hybrid Wireless Networks", In Doctoral Dissertation of University of California, 2004, 1 page.

Hamdi,"Voice Service Interworking for PSTN and IP Networks", In Journal of IEEE Communications Magazine, vol. 37, Issue 5, May 5, 1999, 14 pages.

Kalmanek,"A Network-Based Architecture for Seamless Mobility Services", In Journal of IEEE Communications Magazine, vol. 44, Issue 6, Jun. 2006, pp. 103-109.

Lee,"The Big Challenge Facing Google's New Smartphone Service", Available at: http://www.vox.com/2015/4/23/8482523/google-project-fi-challenge, Apr. 23, 2015, 8 pages.

Neagle,"NetworkWorld: How will iPhone 6's Wi-Fi calling, VoLTE affect enterprise networks", Available at: http://www.networkworld.com/article/2684976/wireless/how-will-iphone-6s-wi-fi-calling-volte-affect-enterprise-networks.html, Sep. 17, 2014, 4 pages.

Neiger,"Is Wi-Fi Calling the Future of Wireless?", Available at: http://www.fool.com/investing/general/2015/07/12/is-wi-fi-calling-the-future-of-wireless.aspx, Jul. 12, 2015, 8 pages.

Reardon,"Switching from Cell to Wi-Fi, Seamlessly", Available at: http://www.cnet.com/news/switching-from-cell-to-wi-fi-seamlessly/, Dec. 19, 2006, 3 pages.

"International Search Report and Written Opinion", Application No. PCT/US2016/055384, dated Jan. 17, 2017, 10 pages.

"International Search Report and Written Opinion", Application No. PCT/US2016/055382, dated Jan. 17, 2017, 11 pages.

"International Search Report and Written Opinion", Application No. PCT/US2016/055383, dated Jan. 17, 2017, 11 pages.

"Non-Final Office Action", U.S. Appl. No. 14/884,290, dated May 2, 2017, 10 pages.

"International Preliminary Report on Patentability", Application No. PCT/US2016/055382, dated Sep. 27, 2017, 6 pages.

"International Preliminary Report on Patentability", Application No. PCT/US2016/055383, dated Sep. 27, 2017, 6 pages.

"Second Written Opinion", Application No. PCT/US2016/055384, dated Oct. 2, 2017, 7 pages.

* cited by examiner

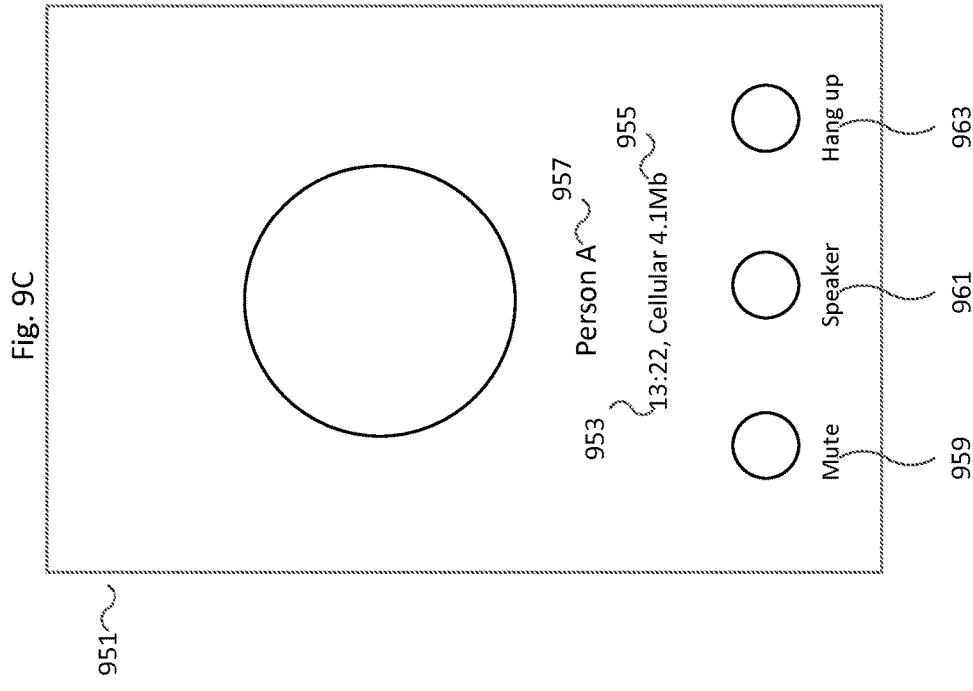
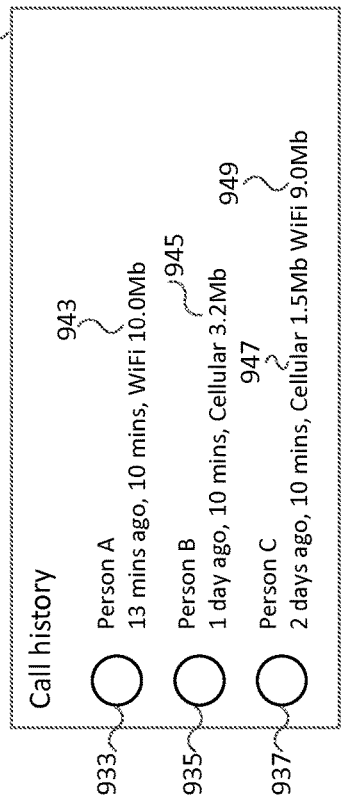
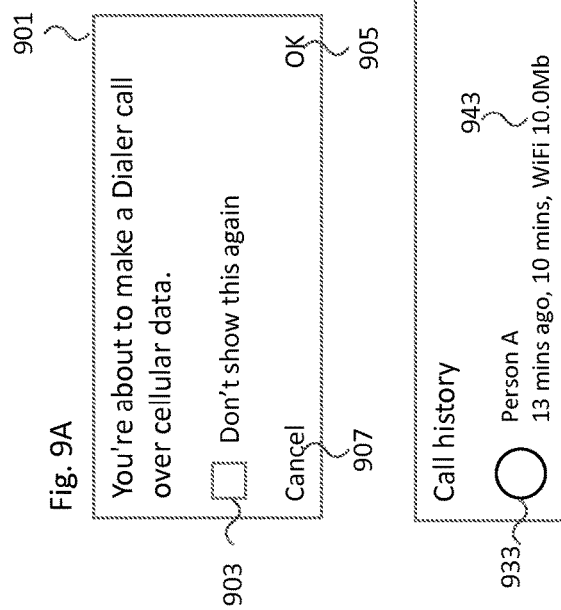

MANAGING COMMUNICATION EVENTS

BACKGROUND

Some communication systems allow the user of a device, such as a personal computer, to conduct voice or video calls over a packet-based computer network such as the Internet as well as conventional circuit switched networks such as GSM and PSTN communication networks. Such communication systems include voice or video over internet protocol (VoIP) systems. These VoIP systems are beneficial to the user as they are often of significantly lower cost to use than the conventional fixed line (PSTN) or mobile cellular (GSM) networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

With increasing mobile bandwidths, there is increasing interest in providing packet-based voice and video calls via client applications running on user terminals such as Internet-enabled mobile phones. These user terminals comprise network interfaces 224 such as short-range RF transceivers operating on one or more unlicensed bands for accessing the Internet via wireless access points (e.g. of Wi-Fi access points of WLAN networks), and/or cellular transceivers operating on one or more licensed bands for accessing the Internet via a packet-based service of a cellular network such as GPRS (General Packet Radio Service) or HSPA (High Speed Packet Access).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

Embodiments of the present disclosure relate to management of communication events between first and second user terminals. In particular embodiments of the present disclosure relate to management of communication events using a communication client application (or communication client app). 'Using' a communication client application the user may dial a number or select a suitable contact to place an outgoing call. The call may be placed from the communication client app. The communication client app in such embodiments subscribes to call and dial events. When a number is dialled, or called, the communication client app checks to determine which network the user terminal is communicating over (for example whether the user terminal is using a cellular [2G, 3G or 4G] data link or other [WiFi] network. In some embodiments the user is provided with the option to confirm to make the call when the check determines a poorer quality data link is to be used for the call before placing the call. Furthermore in some embodiments the communication client application is configured to control the signalling between user terminals when the network check determines a poorer quality data link is to be used. In some embodiments the communication client application is further able to monitor data usage during the placed calls to generate data use values which can be displayed to the user during and after the call. In some embodiments the data usage is aggregated across more than one data network. In some embodiments the data use statistics are generated as real-time or near real-time (for example within the last second or so of time) determinations of network usage for the call.

The inventors have recognised managing the communication events in such a manner may be significant, especially for user terminals with limitations with respect to network connectivity and processor power consumption.

In one aspect there is provided a user terminal, the user terminal comprising a communication client application for managing communications with at least one further user terminal over a first network, the communication client application being configured to: determine with respect to at least one outgoing call the first network is a lower bandwidth data network; generate an interrupt message to be displayed; determine a user input in response to the interrupt message; and manage a placement of the communications with the at least one further user terminal over the first network based on the user input.

According to a second aspect there is an apparatus comprising: at least one processor; and a memory comprising communication client application code for managing communications with at least one further apparatus over a first network, the code when executed on the at least one processor, causes the apparatus to: determine with respect to at least one outgoing call the first network is a lower bandwidth data network; generate an interrupt message to be displayed; determine a user input in response to the interrupt message; and manage a placement of the communications with the at least one further apparatus over the first network based on the user input.

According to a third aspect there is provided a method for managing communications with at least one apparatus over a first network, the method comprising: determining with respect to at least one outgoing call the first network is a lower bandwidth data network; generating an interrupt message to be displayed; determining a user input in response to the interrupt message; and managing a placement of the communications with the at least one further apparatus over the first network based on the user input.

BRIEF DESCRIPTION OF THE DRAWINGS

For a better understanding of the present disclosure and to show how it may be put into effect, reference is now made by way of example to the accompanying drawings in which:

FIGS. 9A to 9C are example UI messages with respect to some embodiments.

DETAILED DESCRIPTION

Embodiments of the present disclosure are described by way of example only.

Figure 1:
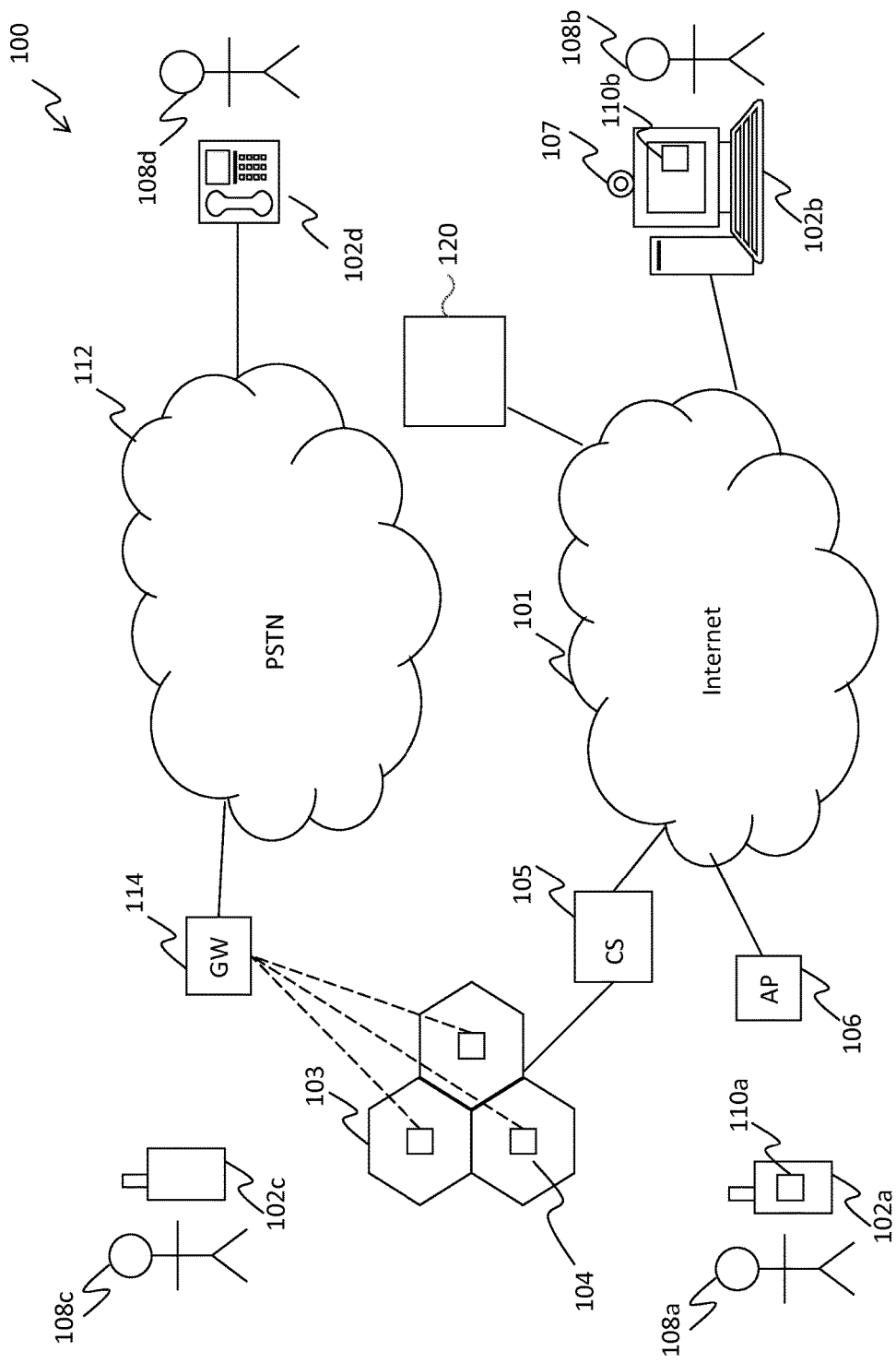
FIG. 1 is a schematic representation of a communication system.

FIG. 1 is a schematic illustration of a communication system 100 comprising a packet-based network 101 such as the Internet, a mobile cellular network 103, and a circuit switched network 112 such as the public switched telephone network (PSTN). The mobile cellular network 103 comprises a plurality of base stations 104 (sometimes referred to as node Bs in 3GPP terminology). Each base station 104 is arranged to serve a corresponding cell of the cellular network 103. Each base station 104 is connected to the circuit switched network 112 via a gateway 114. Further, the packet-switched network 101 comprises a plurality of wireless access points 106 such as Wi-Fi access points for accessing the Internet. These may be the access points of one or more wireless local area networks (WLANs).

A plurality of user terminals 102 are arranged to communicate over one or more of the networks 101,103,112. For merely illustration purposes only, FIG. 1 shows user terminal 102a as an Internet-enabled mobile device, user terminal 102b as a desktop or laptop PC, user terminal 102c as a cellular mobile phone 102c, and user terminal 102d as a landline telephone connected to the circuit switched network 112.

Figure 2:
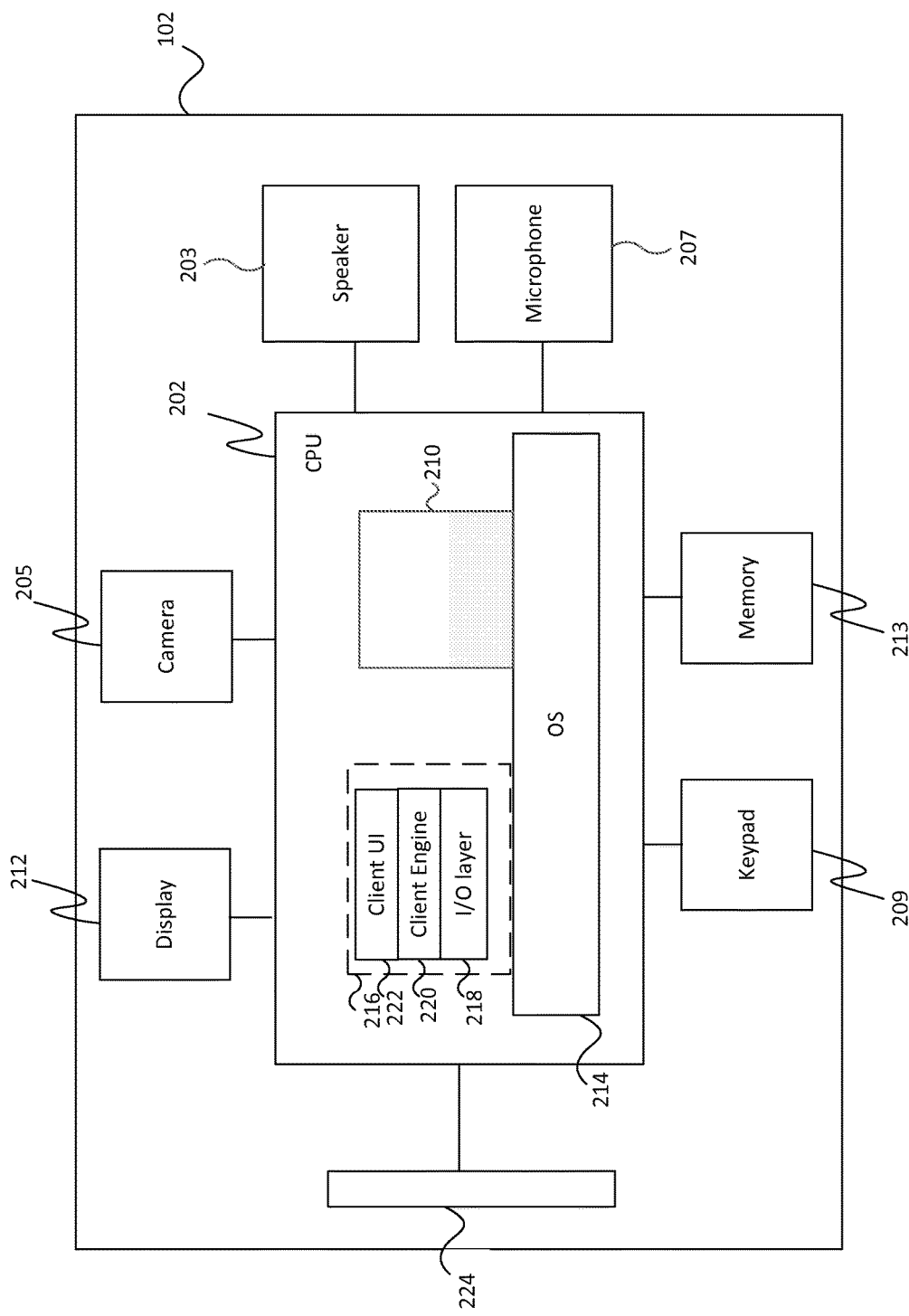
FIG. 2 is a schematic block diagram of a mobile terminal.

An example user terminal 102a is shown schematically in FIG. 2. The user terminal 102a may be one of an Internet-enabled mobile telephone; a handheld game console; a personal digital assistant (PDA); a tablet computer; or a laptop computer.

The user terminal 102a comprises a processing apparatus in the form of one or more processor units (CPUs) 202 coupled to a memory 213 storing a communication client application (or communication client app). The processor 202 is also coupled to: a microphone 207, a speaker 203, camera 205, one or more network interfaces 224, a keypad 209, and a display 212.

In the example shown in FIG. 2, the microphone 207, speaker 203, camera 205, keypad 209, and display 212 are examples of suitable user interface inputs and outputs. In some embodiments the user interface input may be a keyboard, mouse, pointing device, touchpad or any suitable user interface input device, for example gesture or motion control user input, head-tracking or eye-tracking user input, a 'touch' or 'proximity' detecting input configured to determine the proximity of the user to the display 212 (in other words a touch or hover touch interface).

The one or more network interfaces 224 enable the user terminal 102a to access the one or more networks 101,103, 112. For example, user terminal 102a may comprise a cellular wireless transceiver for accessing the mobile cellular network 103 via the base stations 104, and/or a wired or wireless modem for accessing the Internet 101. In the case of a wireless modem, this typically comprises a short-range wireless transceiver (e.g. Wi-Fi) for accessing the Internet 101 via the wireless access points 106.

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology or Radio Network Controllers (RNCs) in USTM or HSPA terminology.

The memory 213 may comprise a non-volatile memory such as an electronic erasable and programmable memory (EEPROM, or "flash" memory) coupled to the processor 202. The memory stores communications code arranged to be executed on the processor, and configured so as when executed to engage in communications over one or more networks 101,103,112. The communications code preferably comprises a communication client application 110a provided by a software provider associated with the communication system. The communication client application 110a may be executed for performing communications such as voice or video calls with other user terminals 102 over the Internet 101, via a network interface 224 and wireless access points 106, and/or via the network interface 224, base stations 104 and controller stations 105 of the cellular network 103 as discussed above. However, one or more of the user terminals 102 involved could alternatively communicate via the network interface 224 and a wired modem, e.g. in the case of a call between a mobile terminal and a desktop PC The CPU 202 is connected to the network interface 224 such as a modem for communication with the communication networks. The network interface 224 may be integrated into the user terminal 102 as shown in FIG. 2. In alternative user terminals the network interface 224 is not integrated into the user terminal 102. The network interface 224 may comprise a short-range wireless transceiver for communication to the wireless access points or a cellular transceiver for communication to the base stations.

As shown in FIG. 1 both user terminals 102a and 102b execute communication client application software 110 in order for the user terminals 102a and 102b to transmit and receive data over the Internet 101. In other words the communication client application may be used to initiate packet based communication with another communication client application associated with the same communication network (for example an overlay network and distinct from the communication system 100). The communication client application may for example be configured to transmit and receive data associated with a defined communication protocol to define the network. For example the communication client application may be configured to communicate with other communication client applications executed on further user terminals using a Voice over Internet Protocol (VoIP) protocol. It is understood that in some embodiments a user terminal comprises some other communication client software, for example communication client software able to communicate over only one of the communication networks. The communication client application 110 may be downloaded and installed from a remote server. Furthermore in some embodiments the communication client application 110 when first installed or executed may be configured to contact and register the installation or execution of the communication client application at a communication client application database. The communication client application database may comprise parts which are locally cached on the user terminal 102, or remote from the user terminal (for example on a server or over a distributed computing system). Furthermore in some embodiments the communication client application is configured to communicate with a communication server configured to handle and direct communications to further communication client applications operating on other user terminals.

FIG. 2 also illustrates an operating system ("OS") 214 executed on the CPU 202. Running on top of the OS 214 is a software stack 216 for the communication client application (CCA) 110a. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the device 102a and handles the transmission and receipt of data via the network interface 207. The client protocol layer 218 of the communication client app communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 108a via the user interface of the client and to receive information from the user 108a via the user interface.

Also shown in FIG. 2 is a communication client application 210. The further communication client may be a native communication client (the communication client provided with the device from the factory. The further communication client may thus be executed for performing communications such as voice or video calls with other user terminals 102 over the network interface 224, base stations 104 and controller stations 105 of the cellular network 103 as discussed above.

The following examples describe the use of a communication client application 110/210 in order to control the setting up and communicating of a call following the user dialling a number to place an outgoing call.

The communication client application may be able to make or place a call while at the user terminal is operating on a lower bandwidth (such as a cellular) network other than a higher bandwidth (such as Wi-Fi) network. However the quality of the call placed on a cellular network may be below the standard desired by the user. Furthermore in order to prevent the user using valuable cellular (or other lower bandwidth) data allowances placing a poor quality call embodiments described herein may enable a suitable user interface interrupt message to be displayed to the user when the network is determined or evaluated to be a lower bandwidth network. Furthermore the interrupt message may enable an 'ok' input to be made and allow the call to be placed over the cellular data network. In some embodiments the interrupt message may enable a 'cancel' input to enable the user to cancel the placement of the call. Furthermore in some embodiments the interrupt message may enable a 'postpone' input to enable the user to postpone the placing of the call until an acceptable bandwidth network, such as WiFi network, is determined.

Furthermore when the user operating the user terminal places a call using the lower bandwidth (e.g. cellular) network embodiments of the application enable the control of the network resources so to reduce network resources used by the communication and other applications and thus enable a greater proportion of the available bandwidth to be used by the call and thus improve the quality of the placed call. Thus for example in some embodiments the control or setting up of communication telemetry is based on the determined network to prevent bandwidth resources from being used for telemetry during a placed call. In some embodiments the operating system can control other applications or code operating on the user terminal in order to throttle back the use of network resources for other applications. Furthermore in some embodiments as described herein the operating system may negotiate with the callee (e.g., other user terminals) participating in the communication in order to control the return path bandwidth.

By implementing such operations a suitable bandwidth for both downlink and uplink communications can be controlled.

Figure 3:
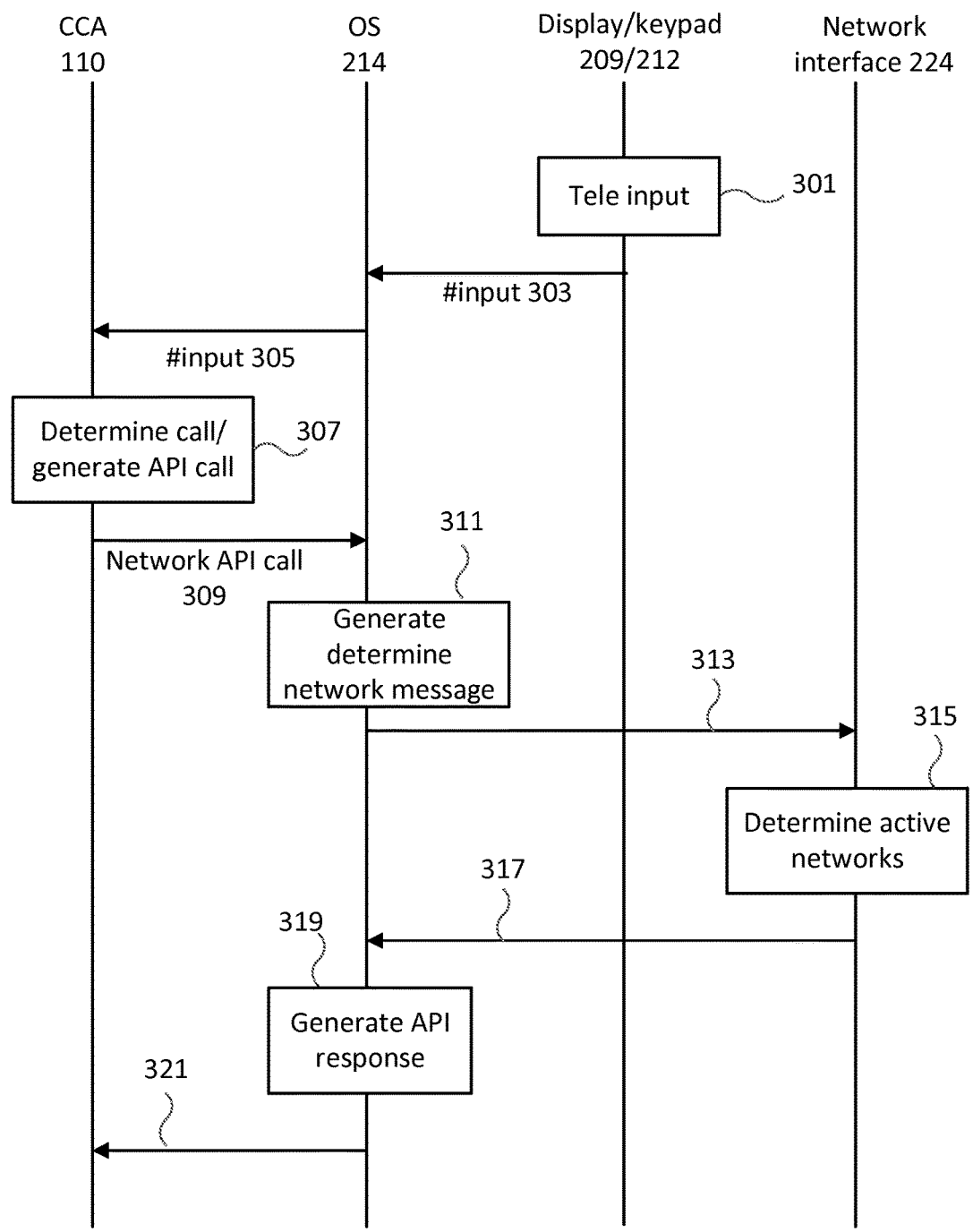
FIG. 3 is an example flow diagram of a communication client network determination operation.

With respect to FIG. 3 a flow diagram of a communication client network determination or evaluation operation is shown. The communication client network determination operation in some embodiments may generate a real-time or 'near real-time' determination or evaluation of the network being used to communicate with a communications server and/or other user terminals.

The example shown in FIG. 3 shows a sequence wherein the communication client network determination is performed following a determination of a telecommunications input for placing a call with a further communication client application installed on at least one other user terminal.

In the example shown herein the keypad 209 (as an example of an input UI) may input a telephone number to be called. It is understood that the input user interface may be any suitable input such as touch screen, gesture, voice etc. Furthermore it is understood that the number input is an example of a suitable place call address and any other suitable indicator of the party to be called can be input and resolved to place the call.

The operation of inputting a telephone number is shown in FIG. 3 by step 301.

This telephone number (or number or # input) can be passed to the operating system (OS) 214.

The operation of passing the number input from the keypad 209 to the operating system 214 is shown in FIG. 3 by step 303.

The OS 214 may then be configured to use registered communication client information to determine that the communication client application 210/110 is to receive the number input.

The OS 214 may then forward the number input to the communication client application 110.

The operation of determining the communication client to receive the number input and forwarding the number input to the communication client application is shown in FIG. 3 by step 305.

The communication client application 110, having received the number input may then determine that there is potentially a call to be placed and generate a network determination or evaluation application programming interface (API) call to initialize the determination or evaluation of the network which is currently active and available for placing the call.

The operation of generating a network determination API call having determined that there is a potential call to be placed is shown in FIG. 3 by step 307.

The communication client application (CCA) 110 may forward the network determination API call to the operating system (OS) 214.

The operation of forwarding the network determination API call from the CCA 110 to the OS 214 is shown in FIG. 3 by step 309.

The OS 214 may receive the network determination API call and determine or evaluate a current network message for the network interface.

The operation of generating a current network message is shown in FIG. 3 by step 311.

The current network message may be forwarded to the network interface 224.

The operation of forwarding the current network message is shown in FIG. 3 by step 313.

The network interface 224 having received the current network message may be configured to determine which networks are currently active for placing calls from the user terminal. The network interface 224 may in some embodiments return a list of available or active communication networks which can currently be used. For example whether the network interface 224 is able to access or is accessing a Wi-Fi or similar higher bandwidth network, or a cellular or similar lower bandwidth network. In some embodiments the network interface 224 is configured to output a type of cellular network available. For example the list may comprise a 2G data network, an EDGE data network, a 3G or GPRS data network, a HSDPA or HSDPA+ data network, a 4G or LTE or other type of the cellular data network.

The operation of determining the current or active network (or type of network) able to be accessed or being accessed by the user terminal and the generation of the current network response is shown in FIG. 3 by step 315.

The current network response may then be passed back to the operating system (OS) 214.

The operation of forwarding the current network response from the network interface 224 to the OS 214 is shown in FIG. 3 by step 317.

The OS 214, having received the current network response may then generate a suitable network determination API response.

The operation of generating a suitable network determination API response is shown in FIG. 3 by step 319.

The network determination API response is then passed back from the OS 214 to the CCA 110.

The operation of passing back the network determination API response is shown in FIG. 3 by step 321.

In such embodiments the CCA 110 is able to determine or evaluate the potential call available networks over which the call could be placed. Furthermore this information is generated in 'real-time' or as near real-time as can be, the evaluation having been determined based on a determined or potential call to be placed. Thus in such embodiments the reliability of the evaluation or determination of the network to be used by the call is high and thus errors generated by using unreliable or out of date network information is reduced.

Figure 4:
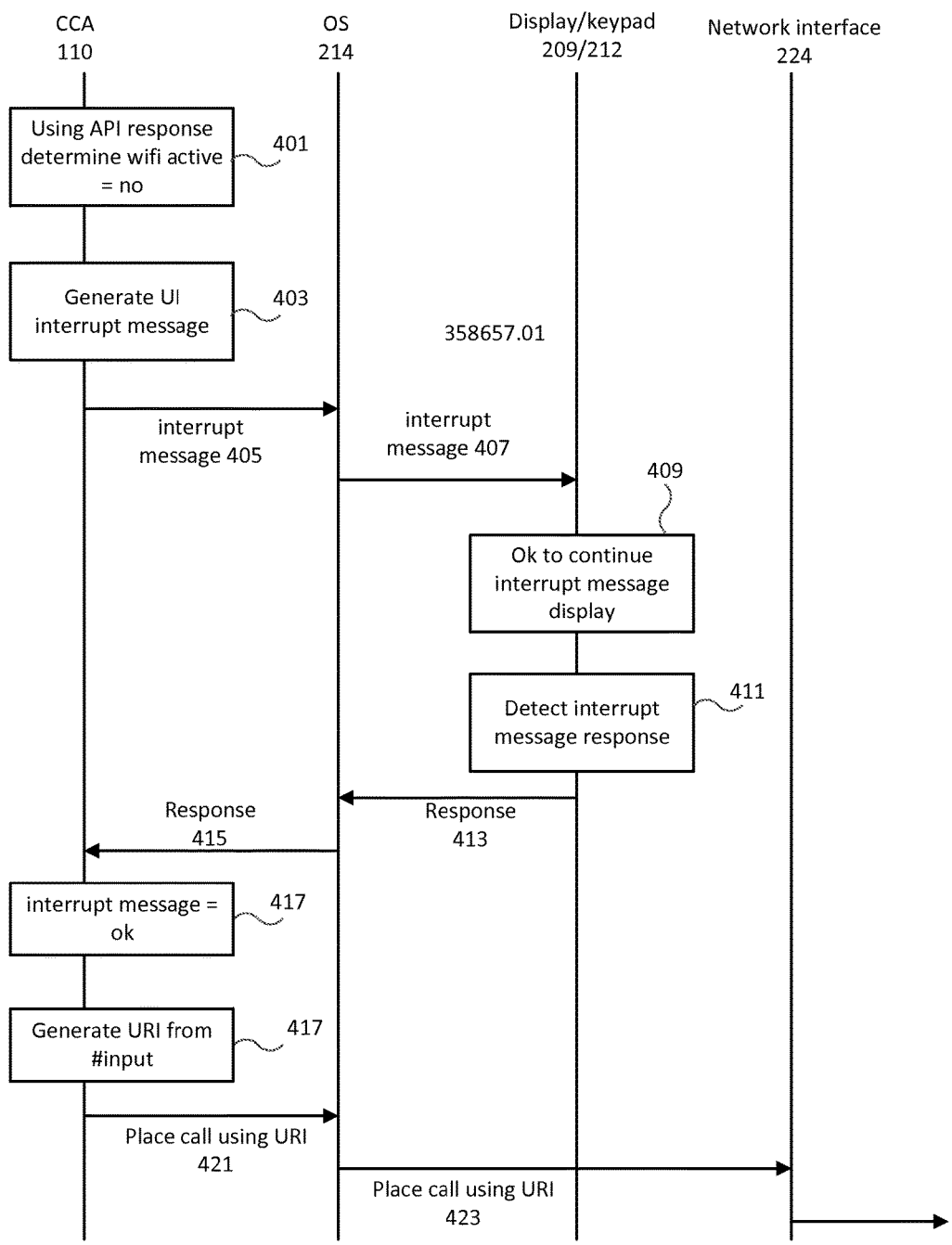
FIG. 4 is an example flow diagram of a communication client cellular confirmation check operation.
Figure 5:
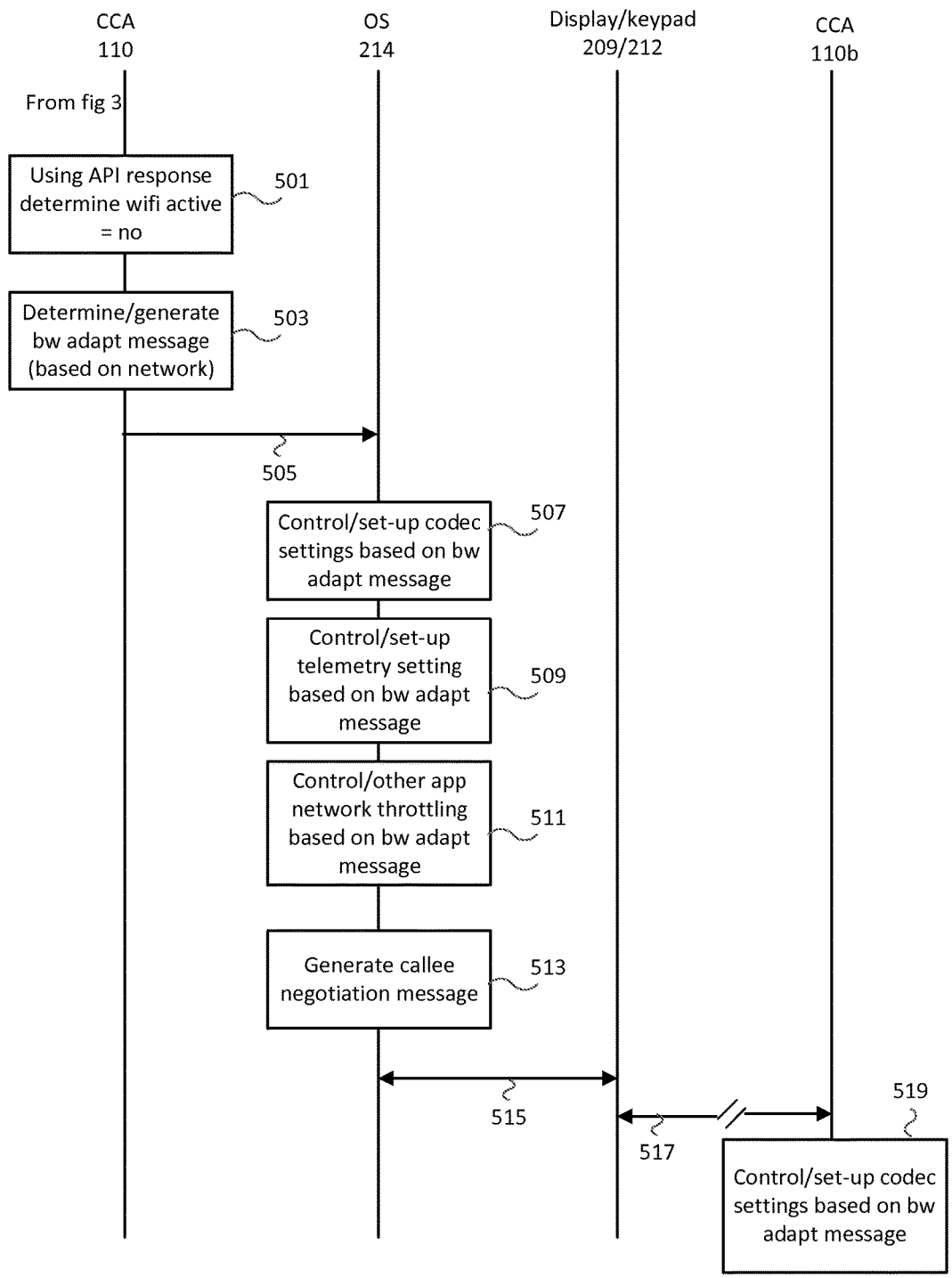
FIG. 5 is an example flow diagram of a communication client cellular data usage operation.
Figure 6:
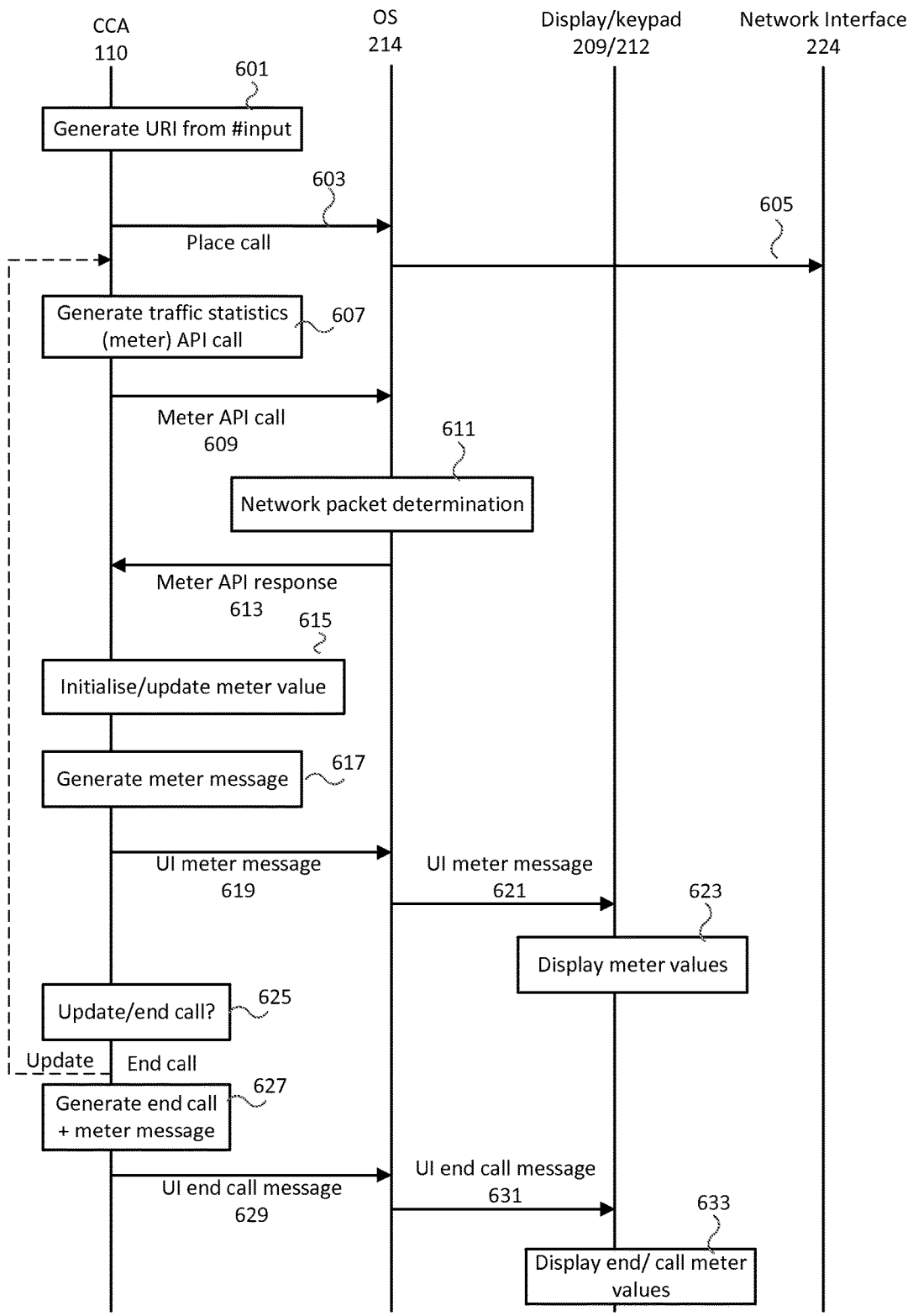
FIG. 6 is an example flow diagram of communication client data usage metering operation.

With respect to FIGS. 4 to 6, there are shown various operations according to some embodiments where the network determination shown in FIG. 3 is used as an input.

For example with respect to FIG. 4 an example flow diagram of a communication client cellular confirmation check operation is shown. The communication client cellular (or lower bandwidth data network) confirmation check operation is performed when it is determined that the current or available data network is a cellular network (or a lower bandwidth data network) rather than a WiFi (or a higher bandwidth data network). The concept of the employment of a confirmation check for a cellular (or lower bandwidth data) network is to firstly indicate to the user that the current network which is to place the call could produce a poor quality call, secondly to indicate to the user that the current network is more suitable for other types of communication and thirdly to indicate to the user that placing a call using such a network is likely to consume valuable low bandwidth resources which more effectively be allocated to other applications more suited for lower bandwidth (cellular) data networks.

Thus for example the communication client application (CCA) 110 may use the network determination API response to determine whether or not the Wi-Fi (or higher bandwidth) network is active.

When it is determined that the Wi-Fi network is current then the call is placed by generating a suitable URI based on the input number and place the call via the operating system and network interface such as shown in the steps 419, 421 and 423 as shown later.

When the CCA 110 determines that that the Wi-Fi network is not active but the cellular network is current or active then the CCA 110 can be configured to generate a suitable user interface interrupt message.

The operation of determining that the current network or active networks do not include the Wi-Fi network is shown in FIG. 4 by step 401.

Furthermore the operation of generating a suitable user interface (UI) interrupt message is shown in FIG. 4 by step 403.

The communication client application (CCA) 110 may then forward the interrupt message to the operating system (OS) 214.

The operation of forwarding the interrupt message from the CCA 110 to the OS 214 is shown in FIG. 4 by step 405.

The interrupt message may then be forwarded from the OS 214 to the display 209.

The operation of forwarding the interrupt message from the OS 214 to the display 209 is shown in FIG. 4 by step 407.

The display 209 may be configured to generate a suitable interrupt message to be displayed to the user.

An example of a suitable user interface can be shown in FIG. 9A. FIG. 9A, for example, shows an example pop-up user interface message 901 which comprises a text field "You're about to make a direct call over cellular data" and then further comprises two user interface buttons and a check box. The first button is an 'okay' button 905 configured to enable the user to select an input to enable the call to be made or placed over the cellular data network. The second button shown in FIG. 9A is a 'cancel' button 907 configured to enable the user to select an input to cancel or prevent the call being made or placed over the cellular data network. The check box 903 shown in FIG. 9A is a check box to enable the user to prevent or suppress the generation of any further interrupt messages by the CCA 110.

The example UI message shown is an example of an interrupt message which enables the user interface display to display a notification message which can be responded to. It is understood that in some embodiments the interrupt message may be any suitable user interface output or notification which may be responded to by a suitable input. For example the message may be a suitable audio message and the input an audible response from the user.

The operation of generating a UI interrupt message is shown in FIG. 4 by step 409.

Furthermore the as indicated the display/keypad can be configured to detect a response to the UI interrupt message. The response to the interrupt message can be used to generate a suitable response to be forwarded to the operating system (OS) 214.

The operation of detecting a response to the interrupt message and generating a suitable response is shown in FIG. 4 by step 411.

The interrupt message response may then be forwarded from the display/keypad to the OS 214.

The forwarding of the interrupt message response from the display/keypad to the OS 214 is shown in FIG. 4 by step 413.

The OS 214 may then forward the response to the CCA 110.

The operation of forwarding the interrupt message response from the OS 214 to the CCA 110 is shown in FIG. 4 by step 415.

The CCA 110 may then respond to the interrupt message response contents. For example the CCA 110 may determine to place the call based on the interrupt message response indicating that the user has selected an ok to continue response.

The operation of a checking whether the contents of the interrupt message response indicates that it is ok to continue is shown in FIG. 4 by step 417.

When the contents of the interrupt message response indicates that the placement of the call should be cancelled, then the CCA may stop performing any further CCA actions with respect to the current request for placing a call. For example in some embodiments the placement of the call can be cancelled and furthermore a suitable user Interface message generated and passed to the display to indicate that the call has not been placed.

In some embodiments the interrupt message response contents may furthermore indicate that the placement of the call is to be postponed. In such embodiments the CCA may generate a suitable user interface message to show the call is currently placed in a holding line while waiting for the user terminal to connect to a suitable Wi-Fi network to then enable the call to be placed over a suitable higher bandwidth data connection.

The CCA 110, having determined that the contents of the interrupt message response indicate that a call is to be placed, may be configured to generate a suitable address URI from the number input.

The operation of generating the URI from the number input is shown in FIG. 4 by step 419.

The CCA 110 may then forward the URI to the operating system (OS) 214 to place the call.

The forwarding of the URI from the CCA 110 to the OS 214 is shown in FIG. 4 by step 421.

The OS 214 may then place the call via the network interface 224.

The placing of the call via the network interface is shown in FIG. 4 by step 423.

In some embodiments when it is determined that the call can be placed over a cellular network the communication client application (CCA) 110 may be configured to control the placing of the call over the cellular network. In such a manner the call quality for the placed call can be guaranteed at a minimum quality level even when the call is placed over a lower bandwidth (cellular) data network.

In some embodiments, such as described with respect to FIG. 5, the CCA 110 is configured to generate a single type cap bandwidth message independent on the type of lower bandwidth (cellular) data network being detected. However it is understood that in some embodiments the cap bandwidth message can further comprise a parameter based on the type of cellular network available which causes a more finely grained control of the operations described herein. In other words the cap bandwidth message may be based on whether the cellular network available is a 2G, EDGE, 3G or GPRS, HSDPA or HSDPA+, 4G or LTE network and control the placement of the call in the following ways based on the expected available bandwidth in the current cellular data network.

Thus for example the communication client application (CCA) 110 may use the network determination API response to determine whether or not the Wi-Fi (or higher bandwidth) network is active.

When it is determined that the Wi-Fi network is current then the call is placed by generating a suitable URI based on the input number and place the call via the operating system and network interface using no bandwidth adaptation or bandwidth capping as described herein.

When the CCA 110 determines that that the Wi-Fi network is not active but the cellular network is current or active then the CCA 110 can be configured to generate a suitable bandwidth adaptation message.

The operation of determining that the current network or active networks do not include the Wi-Fi network is shown in FIG. 5 by step 501.

The operation of determining or generating a bandwidth adaptation message to be sent to the operating system 214 is shown in FIG. 5 by step 503.

The CCA 110 may then forward the bandwidth adaptation message to the OS 214.

The operation of forwarding the bandwidth adaptation message from the CCA 110 to the OS 214 is shown in FIG. 5 by step 505.

Having received the bandwidth adaptation message the OS 214 can be configured to perform at least one of the following bandwidth limiting operations.

In some embodiments the OS 214 can be configured to control or set-up the codec used to carry the call from the user terminal to the other user terminal. The control of the codec settings can for example change the type of codec used, for an adaptive or variable bit rate codec change the bit rates assigned to components of the codec. Furthermore in some embodiments the codec settings effect the selection and generation of error detection or error correction bits. The codec settings may furthermore include the down-sampling and down-conversion of data packets to set the uplink cap rate.

The operation of controlling or setting up the codec settings are based on the cap message is shown in FIG. 5 by step 507.

In some implementations the OS 214 is configured to control the communication telemetry based on the cap bandwidth message. For example in some embodiments the telemetry settings are changed such that all telemetry data is halted or stopped from being transmitted from the user terminal during the call duration. Furthermore in some embodiments the communication telemetry settings are set to only transmit the communications telemetry at a predetermined time or number of periods during the day. This predetermined time is selected to be a 'quiet' time when it is not expected that the user will make a call.

The control of the communication telemetry settings based on the cap bandwidth message is shown in FIG. 5 by step 509.

Furthermore in some embodiments the OS 214 can be configured to control other applications and particularly the network resources available to other applications based on the cap bandwidth message. For example the OS 214 can be configured to throttle access to network resources by other applications running on the user terminal based on the cap bandwidth message to enable a greater proportion of the available network resources to be used to carry the call and not spread the resources thinly over several applications.

The control of access to network resources for other applications based on the cap bandwidth message is shown in FIG. 5 by step 511.

Whilst these operations can control the uplink bandwidth usage from the user terminal to a suitable communication server or further user terminal they do not control the downlink bandwidth usage from the communication server or further user terminal.

Thus in some embodiments the operating system (OS) 214 is configured to generate a bandwidth adaptation negotiation message.

The generation of a bandwidth adaptation negotiation message is shown in FIG. 5 by step 513.

This bandwidth adaptation negotiation message may be transmitted via the network interface 224 to a further user terminal and further user terminal communication client application 110*b*.

The operation of transmitting the bandwidth adaptation negotiation message to the network interface is shown in FIG. 5 by step 515.

The operation of transmitting the bandwidth adaptation negotiation message to the further user terminal communication client application 110*b* is shown in FIG. 5 by step 517.

The further user terminal communication client application 110*b* may furthermore control the further user terminal OS to control the bandwidth of the call used in the downlink path. For example the further user terminal OS may furthermore control the down-sampling and down-conversion of data packets to set the downlink cap rate.

The setting of the downlink bandwidth adaptation rate at the further user terminal is shown in FIG. 5 by step 519.

Thus in such embodiments the network resources available can be managed more effectively and enable a suitable user experience during the placed call to be effectively guaranteed.

With respect to FIG. 6 an example flow diagram of communication client data usage metering operation is shown in further detail. In order that the user may monitor and control the use of valuable resources such as network resources on a lower bandwidth (cellular) network the user can be informed of the current network usage during as well as following a call.

The example shown in FIG. 6 shows the operation of monitoring or metering the network resources used during and following the call in real-time or near real-time. Thus the following operations may be performed following the determination of the current network and furthermore in some embodiments following the communication client cellular confirmation check operation determining that the user is ok placing a call over a cellular network.

The CCA 110 may be configured to generate a suitable address URI from the number input.

The operation of generating the URI from the number input is shown in FIG. 6 by step 601.

The CCA 110 may then forward the URI to the operating system (OS) 214 to place the call.

The forwarding of the URI from the CCA 110 to the OS 214 is shown in FIG. 6 by step 603.

The OS 214 may then place the call via the network interface 224.

The placing of the call via the network interface is shown in FIG. 6 by step 605.

The communication client application (CCA) 110 may be configured to generate a traffic statistics (or meter) API call for network usage with respect to uplink and downlink data.

The operation of generating a traffic statistics API call is shown in FIG. 6 by step 607.

The traffic statistics API call may then be forwarded to the OS 214.

The operation of forwarding the traffic statistics API call (or meter API call) from the CCA 110 to the OS 214 is shown in FIG. 6 by step 609.

The OS 214 having received the traffic stats (meter) API call can be configured to generate a traffic statistics API response. This traffic statistics response for example may further comprise an operation of requesting a current network packet data uplink and/or downlink byte value associated with the network being communicated over.

The operation of determining the traffic stats (meter) API response is shown in FIG. 6 by step 611.

The traffic statistics API response may then be passed from the OS 214 to the CCA 110.

The operation of forwarding the traffic statistics API response from the OS 214 to the CCA 110 is shown in FIG. 6 by step 613.

The CCA 110 may then be configured to initialise (for an initial meter count) or update (for a continuing metering count) a meter value associated with the traffic statistics API response for the placed call. In some embodiments the initialisation or updating of the meter value is furthermore performed for a specific network being used to carry the call at that time. In other words the bytes or packets being counted are allocated or aggregated to a specific network and thus where the call is carried over more than one network or type of network then more than two meters may be stored. More generally a single counter or meter is used to meter data usage for a specific placed call.

The operation of initialising or updating the meter value is shown in FIG. 6 by step 615.

The CCA 110 may then be configured to generate a meter message (or meter update message).

The operation of generating the meter message (or update meter message) is shown in FIG. 6 by step 617.

The meter message may in some embodiments be passed to the OS 214.

The forwarding of the meter message is shown in FIG. 6 by step 619.

The OS 214 may furthermore be configured to forward the meter message to the display.

The forwarding of the meter message to the display is shown in FIG. 6 by step 621.

The display may then display the meter values.

The operation of displaying at the meter values is shown in FIG. 6 by step 623.

With respect to FIG. 9C an example meter value message is shown.

The message 951 shown in FIG. 9C comprises an indicator 957, for example a picture or other avatar representing the callee. The message 951 may furthermore comprise call control functions such as the user interface buttons for mute 959, speaker 961, and hangup 963.

The message 951 furthermore may show the call duration field 953 and the meter value 955. In some embodiments the meter value 955 shows both the value of the network usage and also the network type. Thus the example shown in FIG. 9C shows a current call network usage of 4.1 Mb over a cellular network.

The CCA 110 may in some embodiments be configured to determine whether or not to update the current meter count value or end the call (for example in response to a timer determining a time period has passed since the last update and/or the user providing a user input ending or hanging up the call).

The operation of determining whether to update the counter or end call is shown in FIG. 6 by step 625.

When the CCA determines that an update should occur, for example a determined time period has passed since the traffic statistics API call was generated, then a further traffic statistics API call is generated shown by the dashed line loop.

When the CCA 110 determines that the call has been ended, for example by receiving the hang-up user input from the display 209 shown by the hang-up button 963, then the CCA can be configured to generate an end call meter message to be displayed on the display.

The operation of generating the end call meter message is shown in FIG. 6 by step 627.

The end call meter message can then be passed to the operating system 214.

The forwarding of the end meter message from the CCA 110 to the OS 214 is shown in FIG. 6 by step 629.

The end call meter message may then be passed to the display.

The forwarding of the end call meter message from the OS 214 to the display 209 is shown in FIG. 6 by step 631.

Furthermore the display 209 may then display the end call meter message.

The operation of displaying the end call meter message at the end of the call is shown in FIG. 6 by step 633.

An example of an end call meter message/call history message 931 is shown in FIG. 9B. The message 931 shows the call history of the last three calls. Each of the last three calls are displayed with a field associated with and identifying the callee or the party called, the time since the end of the call, the call duration, and furthermore the network usage for the call. Thus the message 931 shown in FIG. 9B shows a first entry 933 of a call to 'person a', the call was made 13 minutes ago, had a duration of 10 minutes and consumed 10 Mb of Wi-Fi data as shown by the value 943. The message 931 shows a second entry 935 of a call made to 'person b', the call was made one day ago, had a duration of 10 minutes, and consumed cellular data of 3.2 Mb as shown by the value 945. Furthermore the message 931 comprises a third entry 937 of a call made to 'person c', the call was made 2 days ago, had a duration of 10 minutes, and used 1.5 Mb of cellular data as shown by value 947 and furthermore 9 Mb of Wi-Fi data as shown by value 949.

Although the examples shown herein demonstrate the use of a 'live' network evaluation or determination it is understood that in some embodiments of the processing resources required to generate suitable network determination or evaluations can be significant for low-power devices. Thus in some embodiments of the network evaluation or determination operation can be based on a cached network value. With respect to FIGS. 7 and 8 an example sequence of operations for maintaining an accurate network determination using cached values is shown.

Figure 7:
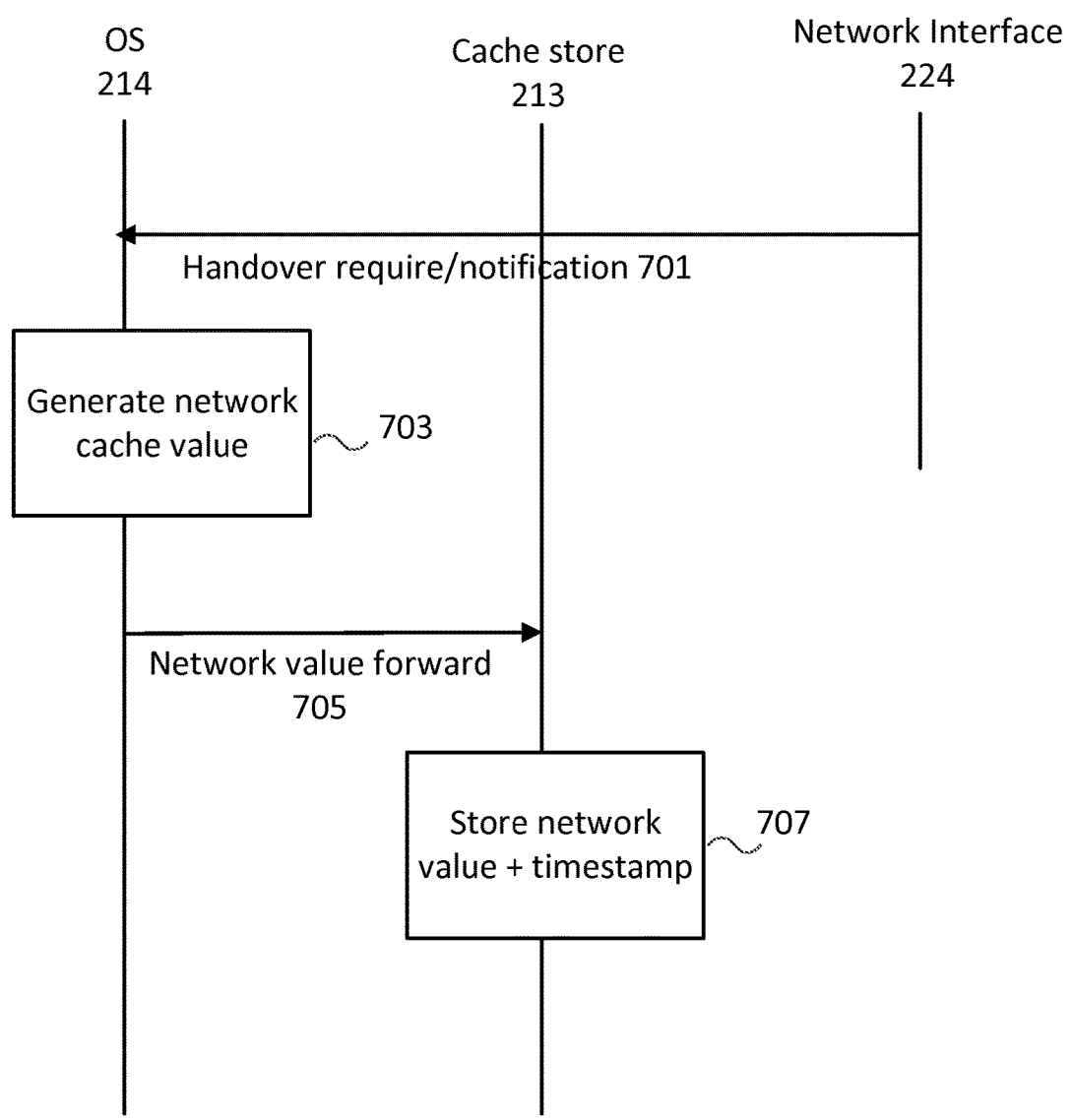
FIG. 7 is an example flow diagram of a network value determination and cache storage operation.

With respect to FIG. 7 a first sequence of operations for generating cached or stored network values based on handover trigger requests or notifications is shown.

Thus for example the network interface 224, on performing a handover from one type of network, such as Wi-Fi, to another type of network, such as cellular, may generate a handover request or notification to be sent to the operating system 214.

The generation of a handover request/notification is shown in FIG. 7 by step 701.

The operating system (OS) 214 having received the handover request/notification can be configured to generate a suitable network value to be cached.

The operation of generating a network cache value is shown in FIG. 7 by step 703.

The OS 214 can then forward the network value to the cache store, such as the memory 213.

The operation of forwarding the network value to a suitable cache store 213 is shown in FIG. 7 by step 705.

The cache store 213 can then be configured to store the network value together with a suitable timestamp value identifying the time at which the network handover request was received or generated.

The operation of storing the network value and time stamp is shown in FIG. 7 by step 707.

Figure 8:
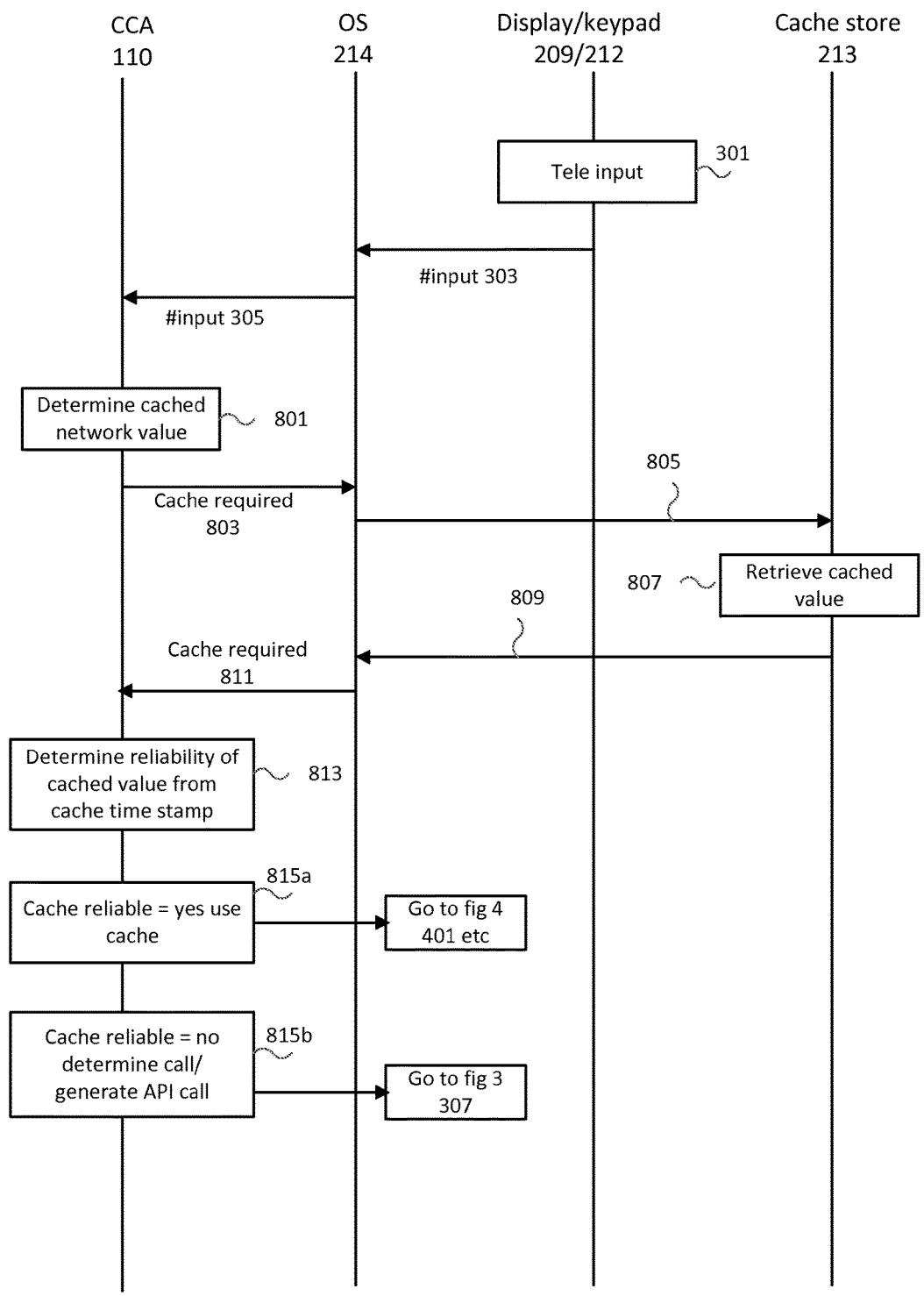
FIG. 8 is an example flow diagram of a further communication client network determination operation incorporating handover network determination.

With respect to FIG. 8 an example network evaluation or determination operation is shown with respect to the use of cached network values stored in the cache store.

In the example shown herein the keypad 209 (as an example of an input UI) may input a telephone number to be called. It is understood that the input user interface may be any suitable input such as touch screen, gesture, voice etc.

The operation of inputting a telephone number is shown in FIG. 8 by step 301.

This telephone number (or number or # input) can be passed to the operating system (OS) 214.

The operation of passing the number input from the keypad 209 to the operating system 214 is shown in FIG. 8 by step 303.

The OS 214 may then be configured to use registered communication client information to determine that the communication client application 210/110 is to receive the number input.

The OS 214 may then forward the number input to the communication client application 110.

The operation of determining the communication client to receive the number input and forwarding the number input to the communication client application is shown in FIG. 8 by step 305.

The CCA 110 for example can generate a cached network request.

The operation of generating a cached network request is shown in FIG. 8 by step 801.

The cached network request may then be forwarded to the OS 214.

The operation of forwarding the cached network request from the CCA 110 to the OS 214 is shown in FIG. 8 by step 803.

The OS 214 can be configured to forward the cached network request to the cache store 213.

The operation of forwarding the cached network request to the cache store 213 is shown in FIG. 8 by step 805.

The cache store 213 can then be configured to retrieve the cashed network value and the associated time stamp.

The operation of retrieving the cached network value is shown in FIG. 8 by step 807.

The cache store 213 may then return the retrieved cashed network value to the OS 214.

The operation of responding to the cached network request with a cached network value within a cache return message is shown in FIG. 8 by step 809.

The OS 214 may then forward the cache return to the CCA 110.

The operation of forwarding the cache return from the OS 214 to the CCA 110 is shown in FIG. 8 by step 811.

The CCA 110 may then compare the timestamp associated with the retrieved cached network value to the current timestamp to determine the reliability factor of the cached network value. For example when the difference between the timestamps is less than a determined threshold value then the reliability of the cached network value is ok.

The operation of determining the reliability of the cached network value from the associated timestamp is shown in FIG. 8 by step 813.

Where the cached network value is determined to be reliable than the cached network value is used. Thus for example the cached network value can be used by the operations such as the communication client cellular confirmation check operation, the communication client cellular data usage operation and the communication client data usage metering operation as shown in FIGS. 4, 5 and 6 respectively.

The operation of accepting the cached network value as reliable is shown in FIG. 8 by step 815*a*.

Where the cached network value is determined to be not reliable, in other words the time stamp of the cached network value is too old to be accepted as being reliable then in some embodiments the operation may determine or generate an API call to evaluate the network or determine the network directly. In other words the operation may proceed with following the communication client network determination operation on FIG. 3 from step 307 onwards.

The operation of determining that the cached network value is unreliable is shown in FIG. 8 by step 815*b*.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

According to a first aspect there is provided a user terminal, the user terminal comprising a communication client application for managing communications with at least one further user terminal over a first network, the communication client application being configured to: determine with respect to at least one outgoing call the first network is a lower bandwidth data network; generate an interrupt message to be displayed; determine a user input in response to the interrupt message; and manage a placement of the communications with the at least one further user terminal over the first network based on the user input.

The lower bandwidth data network may be a cellular data network.

The user input may be an ok input and wherein the communication client application configured to manage a placement of the communications with the at least one further user terminal over the first network based on the user input may be configured to place the outgoing call to enable the communications with the at least one further user terminal.

The user input may be a cancel input and wherein the communication client application configured to manage a placement of the communications with the at least one further user terminal over the first network call based on the user input may be configured to cancel the outgoing call to stop or prevent the communications with the at least one further user terminal.

The user input may be a postpone input and wherein the communication client application configured to manage a placement of the communications with the at least one further user terminal over the first network call based on the user input may be configured to wait placing the outgoing call until the communication client application determines a further network for the at least one outgoing call is a higher bandwidth data network.

The higher bandwidth data network may be a WiFi network.

The communication client application configured to determine with respect to at least one outgoing call the first network is a lower bandwidth data network may be configured to: generate a first network request for determining an identity of the first network in response to the communication client application being configured to determine at least one outgoing call request, the request configured to generate a first network response in real or near real time from a user terminal network interface; receive a first network response identifying the first network is a lower bandwidth data network.

The communication client application configured to determine with respect to at least one outgoing call the first network is a lower bandwidth data network may be configured to: generate a first network cache request for determining an identity of the first network from a cache; receive a first network cache response identifying the first network is a lower bandwidth data network from the cache.

The cache may be configured to store an identity of the first network when the user terminal determines the first network has been changed or handed over.

The communication client application configured to determine with respect to at least one outgoing call the first network is a lower bandwidth data network may be further configured to: receive a timestamp associated with the first network cache response identifying the first network is a lower bandwidth data network from the cache; compare the timestamp with a current timestamp to determine the first network cache response is reliable.

According to a second aspect there is provided an apparatus comprising: at least one processor; and a memory comprising communication client application code for managing communications with at least one further apparatus over a first network, the code when executed on the at least one processor, causes the apparatus to: determine with respect to at least one outgoing call the first network is a lower bandwidth data network; generate an interrupt message to be displayed; determine a user input in response to the interrupt message; and manage a placement of the communications with the at least one further apparatus over the first network based on the user input.

The lower bandwidth data network may be a cellular data network.

The user input may be an ok input and wherein the apparatus caused to manage a placement of the communications with the at least one further apparatus over the first network based on the user input may be further caused to place the outgoing call to enable the communications with the at least one further apparatus.

The user input may be a cancel input and wherein the apparatus caused to manage a placement of the communications with the at least one further user terminal over the first network call based on the user input may be further caused to cancel the outgoing call to stop or prevent the communications with the at least one further apparatus.

The user input may be a postpone input and wherein the apparatus caused to manage a placement of the communications with the at least one further user terminal over the first network call based on the user input may be caused to wait placing the outgoing call until the apparatus determines a further network for the at least one outgoing call is a higher bandwidth data network.

The higher bandwidth data network may be a WiFi network.

The apparatus caused to determine with respect to at least one outgoing call the first network is a lower bandwidth data network may be caused to: generate a first network request for determining an identity of the first network in response to the apparatus caused to determine at least one outgoing call request, the request configured to generate a first network response in real or near real time from an apparatus network interface; receive a first network response identifying the first network is a lower bandwidth data network.

The apparatus caused to determine with respect to at least one outgoing call the first network is a lower bandwidth data network may be caused to: generate a first network cache request for determining an identity of the first network from a cache; receive a first network cache response identifying the first network is a lower bandwidth data network from the cache.

The cache may be configured to store an identity of the first network when the apparatus determines the first network has been changed or handed over.

The apparatus caused to determine with respect to at least one outgoing call the first network is a lower bandwidth data network may be further caused to: receive a timestamp associated with the first network cache response identifying the first network is a lower bandwidth data network from the cache; compare the timestamp with a current timestamp to determine the first network cache response is reliable.

According to a third aspect there is provided a method for managing communications with at least one apparatus over a first network, the method comprising: determining with respect to at least one outgoing call the first network is a lower bandwidth data network; generating an interrupt message to be displayed; determining a user input in response to the interrupt message; and managing a placement of the communications with the at least one further apparatus over the first network based on the user input.

The lower bandwidth data network may be a cellular data network.

The user input may be an ok input and managing a placement of the communications with the at least one further apparatus over the first network based on the user input may comprise placing the outgoing call to enable the communications with the at least one further apparatus.

The user input may be a cancel input and managing a placement of the communications with the at least one further user terminal over the first network call based on the user input may further comprise cancelling the outgoing call to stop or prevent the communications with the at least one further apparatus.

The user input may be a postpone input and managing a placement of the communications with the at least one further user terminal over the first network call based on the user input may comprise waiting placing the outgoing call until the method determines a further network for the at least one outgoing call is a higher bandwidth data network.

The higher bandwidth data network may be a WiFi network.

Determining with respect to at least one outgoing call the first network is a lower bandwidth data network may comprise: generating a first network request for determining an identity of the first network in response to the method determining at least one outgoing call request, the first network request configured to generate a first network response in real or near real time from an apparatus network interface; receive a first network response identifying the first network is a lower bandwidth data network.

Determining with respect to at least one outgoing call the first network is a lower bandwidth data network may comprise: generating a first network cache request for determining an identity of the first network from a cache; receiving a first network cache response identifying the first network is a lower bandwidth data network from the cache.

The method may be configured to store an identity of the first network within the cache when the method has determined the first network has been changed or handed over.

Determining with respect to at least one outgoing call the first network is a lower bandwidth data network may further comprise: receiving a timestamp associated with the first network cache response identifying the first network is a lower bandwidth data network from the cache; comparing the timestamp with a current timestamp to determine the first network cache response is reliable.

According to a fourth aspect there is provided a user terminal, the user terminal comprising a communication client application for managing communications with at least one further user terminal over at least one network, the communication client application being configured to: determine, with respect to at least one outgoing call, a first network identity; generate a traffic data message configured to determine a real-time or near-real-time determination of data usage for the at least one outgoing call over the first network; receive a traffic data response comprising the determination of data usage for the at least one outgoing call over the first network; maintain a counter of the of data usage for the at least one outgoing call over the first network; generate a meter message to display to the user the maintained counter of the data usage for the at least one outgoing call over the first network.

The communication client configured to maintain a counter of the of data usage for the at least one outgoing call over the first network may be configured to repeatedly generate and receive further traffic data messages and traffic data responses to update the counter of the data usage.

The communication client configured to maintain a counter of the of data usage for the at least one outgoing call over the first network may be configured to generate further traffic data messages at a determined period interval.

The communication client configured to generate a meter message to display to the user the maintained counter of the data usage for the at least one outgoing call over the first network may be configured to repeatedly generate meter message to display to the user the maintained counter of the data usage whilst the call is placed.

The communication client may be configured to: determine, with respect to at least one outgoing call, a second network identity; generate a second traffic data message configured to determine a real-time or near-real-time determination of data usage for the at least one outgoing call over the second network; receive a traffic data response comprising the determination of data usage for the at least one outgoing call over the second network; maintain a counter of the of data usage for the at least one outgoing call over the second network; generate a meter message to display to the user the maintained counter of the data usage for the at least one outgoing call over the second network.

The communication client configured to maintain a counter of the of data usage for the at least one outgoing call over the second network may be configured to repeatedly generate and receive further traffic data messages and traffic data responses to update the counter of the data usage.

The communication client configured to maintain a counter of the of data usage for the at least one outgoing call over the second network may be configured to generate further traffic data messages at a determined period interval.

The communication client configured to generate a meter message to display to the user the maintained counter of the data usage for the at least one outgoing call over the second network may be configured to repeatedly generate meter message to display to the user the maintained counter of the data usage whilst the call is placed.

The communication client application configured to determine with respect to at least one outgoing call the first network identity may be configured to: generate a first network request for determining the identity of the first network in response to the communication client application being configured to determine at least one outgoing call request, the request configured to generate a first network response in real or near real time from a user terminal network interface; receive a first network response identifying the first network.

According to a fifth aspect there is provided a an apparatus comprising: at least one processor; and a memory comprising communication client application code for managing communications with at least one further apparatus over a first network, the code when executed on the at least one processor, causes the apparatus to: determine, with respect to at least one outgoing call, a first network identity; generate a traffic data message configured to determine a real-time or near-real-time determination of data usage for the at least one outgoing call over the first network; receive a traffic data response comprising the determination of data usage for the at least one outgoing call over the first network; maintain a counter of the of data usage for the at least one outgoing call over the first network; generate a meter message to display to the user the maintained counter of the data usage for the at least one outgoing call over the first network.

The code caused to maintain a counter of the of data usage for the at least one outgoing call over the first network may be caused to repeatedly generate and receive further traffic data messages and traffic data responses to update the counter of the data usage.

The code caused to maintain a counter of the of data usage for the at least one outgoing call over the first network may be caused to generate further traffic data messages at a determined period interval.

The code caused to generate a meter message to display to the user the maintained counter of the data usage for the at least one outgoing call over the first network may be caused to repeatedly generate meter message to display to the user the maintained counter of the data usage whilst the call is placed.

The code may be caused to: determine, with respect to at least one outgoing call, a second network identity; generate a second traffic data message configured to determine a real-time or near-real-time determination of data usage for the at least one outgoing call over the second network; receive a traffic data response comprising the determination of data usage for the at least one outgoing call over the second network; maintain a counter of the of data usage for the at least one outgoing call over the second network; generate a meter message to display to the user the maintained counter of the data usage for the at least one outgoing call over the second network.

The code caused to maintain a counter of the of data usage for the at least one outgoing call over the second network may be caused to repeatedly generate and receive further traffic data messages and traffic data responses to update the counter of the data usage.

The code caused to maintain a counter of the of data usage for the at least one outgoing call over the second network may be caused to generate further traffic data messages at a determined period interval.

The code caused to generate a meter message to display to the user the maintained counter of the data usage for the at least one outgoing call over the second network may be caused to repeatedly generate meter message to display to the user the maintained counter of the data usage whilst the call is placed.

The code caused to determine with respect to at least one outgoing call the first network identity may be caused to: generate a first network request for determining the identity of the first network in response to the code caused to determine at least one outgoing call request, the request configured to generate a first network response in real or near real time from a user terminal network interface; receive a first network response identifying the first network.

According to a sixth aspect there is provided a method for managing communications with at least one user terminal over at least one network, the method comprising: determining, with respect to at least one outgoing call, a first network identity; generating a traffic data message configured to determine a real-time or near-real-time determination of data usage for the at least one outgoing call over the first network; receiving a traffic data response comprising the determination of data usage for the at least one outgoing call over the first network; maintaining a counter of the of data usage for the at least one outgoing call over the first network; generating a meter message to display the maintained counter of the data usage for the at least one outgoing call over the first network.

Maintaining a counter of the of data usage for the at least one outgoing call over the first network may comprise repeatedly generating and receiving further traffic data messages and traffic data responses to update the counter of the data usage.

Maintaining a counter of the of data usage for the at least one outgoing call over the first network may comprise generating further traffic data messages at a determined period interval.

Generating a meter message to display the maintained counter of the data usage for the at least one outgoing call over the first network may comprise repeatedly generating meter message to display the maintained counter of the data usage whilst the call is placed.

The method may comprise: determining, with respect to at least one outgoing call, a second network identity; generating a second traffic data message configured to determine a real-time or near-real-time determination of data usage for the at least one outgoing call over the second network; receiving a traffic data response comprising the determination of data usage for the at least one outgoing call over the second network; maintaining a counter of the of data usage for the at least one outgoing call over the second network; generating a meter message to display to the user the maintained counter of the data usage for the at least one outgoing call over the second network.

Maintaining a counter of the of data usage for the at least one outgoing call over the second network may comprise repeatedly generating and receiving further traffic data messages and traffic data responses to update the counter of the data usage.

Maintaining a counter of the of data usage for the at least one outgoing call over the second network may comprise generating further traffic data messages at a determined period interval.

Generating a meter message to display to the user the maintained counter of the data usage for the at least one outgoing call over the second network may comprise repeatedly generating meter message to display the maintained counter of the data usage whilst the call is placed.

Determining with respect to at least one outgoing call the first network identity may comprise: generating a first network request for determining the identity of the first network in response to the communication client application being configured to determine at least one outgoing call request, the request configured to generate a first network response in real or near real time from a user terminal network interface; receiving a first network response identifying the first network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A user terminal, the user terminal comprising a non-transitory computer-readable medium configured to maintain instructions that, when executed at the user terminal, implement a communication client application, the communication client application configured to manage communications with at least one further user terminal over a first network, and the communication client application configured to:

determine whether a first bandwidth of the first network meets a bandwidth criterion;
   determine, with respect to at least one outgoing call, that the first network is a lower bandwidth data network based on the first bandwidth meeting the criterion and that no network with a bandwidth higher than the first network is available for the outgoing call;
   responsive to the determining that the first network is the lower bandwidth data network and that there is no network with a bandwidth higher than the first network available for the outgoing call, generate an interrupt message to be displayed;
   determine a user input in response to the interrupt message; and
   manage a placement of the communications with the at least one further user terminal over the first network based on the user input.

2. The user terminal according to claim 1, wherein the lower bandwidth data network is a cellular data network.

3. The user terminal according to claim 1, wherein the user input is an ok input and wherein the communication client application is configured to manage the placement of the communications with the at least one further user terminal over the first network based on the user input, and is configured to place the outgoing call to enable the communications with the at least one further user terminal.

4. The user terminal according to claim 1, wherein the user input is a cancel input and wherein the communication client application is configured to manage the placement of the communications with the at least one further user terminal over the first network based on the user input, and is configured to cancel the outgoing call to stop or prevent the communications with the at least one further user terminal.

5. The user terminal according to claim 1, wherein the user input is a postpone input and wherein the communication client application is configured to manage the placement of the communications with the at least one further user terminal over the first network based on the user input, and is configured to delay placement of the outgoing call until the communication client application determines a further network for the at least one outgoing call is available.

6. The user terminal according to claim 5, wherein the communication client application is further configured to delay placement of the outgoing call until a WiFi network is available for the outgoing call.

7. The user terminal according to claim 1, wherein the communication client application is further configured to:
   generate a first network request for determining an identity of the first network, the first network request configured to generate a first network response in real-time or near real-time from a network interface of the user terminal;
   receive the first network response identifying that the first network is the lower bandwidth data network.

8. The user terminal according to claim 1, wherein the communication client application is further configured to:
   generate a first network cache request for determining an identity of the first network from a cache;
   receive a first network cache response identifying that the first network is the lower bandwidth data network from the cache.

9. The user terminal according to claim 8 wherein the cache is configured to store an identity of the first network when the user terminal determines the first network has been changed or handed over.

10. The user terminal according to claim 8, wherein the communication client application is further configured to:
    receive a timestamp associated with the first network cache response identifying the first network is the lower bandwidth data network from the cache;
    compare the timestamp with a current timestamp to determine the first network cache response is reliable.

11. An apparatus comprising:
at least one hardware processor; and
a memory comprising communication client application code that, responsive to execution by the at least one processor, causes the apparatus to:
determine whether a first bandwidth of the first network meets a bandwidth criterion;
determine, with respect to at least one an outgoing call, that a first network is a lower bandwidth data network based on the first bandwidth meeting the criterion and that no network with a bandwidth higher than the first network is available for the outgoing call;
responsive to the determining that the first network is the lower bandwidth data network and that there is no network with a bandwidth higher than the first network available for the outgoing call, generate an interrupt message to be displayed;
determine a user input in response to the interrupt message; and
manage a placement of the communications with the at least one further apparatus over the first network based on the user input.

12. The apparatus according to claim 11, wherein the lower bandwidth data network is a cellular data network.

13. The apparatus according to claim 11, wherein the user input is an ok input and wherein the apparatus manages the placement of the communications with the at least one further apparatus over the first network based on the user input by placing the outgoing call to enable the communications with the at least one further apparatus.

14. The apparatus according to claim 11, wherein the user input is a cancel input and wherein the apparatus manages the placement of the communications with the at least one further user terminal over the first network based on the user input by cancelling the outgoing call to stop or prevent the communications with the at least one further apparatus.

15. The apparatus according to claim 11, wherein the user input is a postpone input and wherein the apparatus manages the placement of the communications with the at least one further user terminal over the first network based on the user input by waiting to place the outgoing call until the apparatus determines a Wi-Fi network for the at least one outgoing call is available.

16. A method for managing communications with at least one apparatus over a first network, the method comprising:
determining whether a first bandwidth of the first network meets a bandwidth criterion;
determining, with respect to at least one an outgoing call, that the first network is a lower bandwidth data network based on the first bandwidth meeting the criterion and that no network with a bandwidth higher than the first network is available for the outgoing call;
responsive to the determining that the first network is the lower bandwidth data network and that there is no network with a bandwidth higher than the first network available for the outgoing call, generating an interrupt message to be displayed;
determining a user input in response to the interrupt message; and
managing a placement of the communications with the at least one further apparatus over the first network based on the user input.

17. The method according to claim 16, wherein the lower bandwidth data network is a cellular data network.

18. The method according to claim 16, wherein the user input is an ok input and wherein the managing the placement of the communications with the at least one further apparatus over the first network based on the user input comprises placing the outgoing call to enable the communications with the at least one further apparatus.

19. The method according to claim 16, wherein the user input is a cancel input and wherein the managing the placement of the communications with the at least one further user terminal over the first network based on the user input further comprises cancelling the outgoing call to stop or prevent the communications with the at least one further apparatus.

20. The method according to claim 16, wherein the user input is a postpone input and wherein the managing the placement of the communications with the at least one further user terminal over the first network based on the user input further comprises waiting to place the outgoing call until a further network for the at least one outgoing call is determined to be available.

21. A computing device comprising:
at least one hardware processor; and
a memory comprising instructions stored thereon that, responsive execution by the at least one processor, implement a communication client application, the communication client application configured to:
receive a request to initiate a communication session with an additional computing device;
determine that a first network which was previously active and available is not currently active and available for the communication session:
determine that a second network is currently active and available for the communication session;
compare one or more characteristics of the first network with corresponding characteristics of the second network to determine the second network is associated with a lower quality than the first network;
prior to initiating the communication session with the additional device and responsive to the first network no longer being active and the second network being determined to provide a lower quality than the first network, generate an interrupt message requesting user input to confirm use of the second network for the communication session;
receive the user input in response to the interrupt message; and
initiate the communication session with the additional device using the second network in response to user input confirming use of the second network.

22. The computing device of claim 21, wherein the communication client application determines that the first network is not currently active and available based on a network interface of the computing device being unable to access the first network.

23. The computing device of claim 21, wherein the communication client application determines that the first network is not currently active and available in real-time.

24. The computing device of claim 21, wherein the communication session comprises a call.

25. The computing device of claim 24, wherein the communication client application is configured to cancel the call if the user input requests cancellation of the call.

26. The computing device of claim 21, wherein the first network is a higher bandwidth network and the second network is a lower bandwidth data network.

27. The computing device of claim 21, wherein the first network is a WiFi network and the second network is a cellular data network.

28. The computing device of claim 21, wherein the interrupt message is generated for display at the computing device.

29. The computing device of claim 21, wherein the interrupt message comprises an audible message.

* * * * *